United States Patent [19]
Aoyama et al.

[11] Patent Number: 5,971,856
[45] Date of Patent: Oct. 26, 1999

[54] METHOD FOR BACKING UP STATE OF PROGRESS IN TELEVISION GAME

[75] Inventors: Koji Aoyama; Koji Arai, both of Hokkaido, Japan

[73] Assignee: Hudson Soft Co., Ltd., Hokkaido, Japan

[21] Appl. No.: 08/768,109

[22] Filed: Dec. 16, 1996

[30] Foreign Application Priority Data

Dec. 25, 1995 [JP] Japan .................................. 7-350901

[51] Int. Cl.$^6$ .................................................. A63F 9/22
[52] U.S. Cl. ............................................................... 463/43
[58] Field of Search .................................... 463/1, 30, 31, 463/44–45, 36; 273/148 B

[56] References Cited

U.S. PATENT DOCUMENTS

| | | | |
|---|---|---|---|
| 4,053,740 | 10/1977 | Rosenthal | 463/44 |
| 4,180,805 | 12/1979 | Burson | 463/44 |
| 4,752,068 | 6/1988 | Endo . | |
| 4,858,930 | 8/1989 | Sato | 273/148 B |
| 5,267,734 | 12/1993 | Stamper et al. . | |
| 5,273,294 | 12/1993 | Amanai | 273/148 B |

*Primary Examiner*—Jessica J. Harrison
*Assistant Examiner*—Mark A Sager
*Attorney, Agent, or Firm*—McDermott, Will & Emery

[57] ABSTRACT

Disclosed is a method for backing up a state of progress in a television game which has the steps of: dividing the state of progress into a common item and a separate item; and storing the common item into a common file and the separate item into a separate file.

10 Claims, 3 Drawing Sheets

METHOD FOR BACKING UP STATE OF PROGRESS IN TELEVISION GAME

FIELD OF THE INVENTION

This invention relates to a method for backing up a state of progress in a television game, and more particularly to, a method for backing up a state of progress in a television game in which the state of a character, a scenery etc. varies in the process of time.

BACKGROUND OF THE INVENTION

Some conventional television games need to play for a long time period, i.e., it is difficult for them to be finished within one play. In such games, the state of progress at the time when playing is stopped can be saved (stored) in a back-up file. When the game is restarted, the player can play the game from the same state of progress.

In many cases, a plurality of back-up files to be saved are prepared. Thus, the player can select any of the states of progress when the game is restarted. The back-up file can be also made during the playing. For example, if the player wants to restart the game from a scene in which he is interested, the state of progress corresponding to the scene can be saved into a back-up file, and he can restart the game from the same scene by reading out the back-up file any time. As long as the content of the back-up file remains, the game can be repeatedly restarted from the same state.

FIG. 1 shows relationships between back-up files and states of progress and between saving and loading in a game. In this example, the saving is conducted in the order of progress states A, B and C as shown by (1) to (3) in FIG. 1. When the progress state B is, as shown by (4) in FIG. 1, loaded, the game can be restarted from the progress state B.

In FIG. 1, a progress state D is rewritten in the back-up file where the progress state C was saved ((5)). At this time, the progress state C is erased from the back-up file, and the progress states A, B and D are left in the respective back-up files. Though the player can restart the game from any of the progress states A, B and D at this time, he cannot restart it from the progress state C. Anyway, since the progress states in the back-up files are independent of one another, each of the progress states can be always reproduced to go back to the time when it is saved.

However, the conventional back-up method for the television game cannot be suitably adapted to a new type of television game. The reasons are as follows.

There is a television game in which real time (actual time ticked away by a clock) is incorporated into the game story to give a kind of virtual reality. Though such a game can also employ the conventional back-up method, a problem occurs in the case that there exists a character whose state varies in the process of real time. For example, there exists a pet character which needs a proper food to be given within a time period. Now, when the game is repeatedly played by the player, a plurality of back-up files, each of which has different data regarding the food supplying condition of the pet, are saved. When the player restarts to play the game while reading out data of one of the back-up files after several hours, the time period may be passed. Thus, his expectation that the pet is still alive may be disappointed. This is because a plurality of back-up files which are perfectly independent of one another are saved.

SUMMARY OF THE INVENTION

Accordingly, it is an object of the invention to provide a method for backing up a state of progress in a television game in which a state of a character of the game can be varied with time such that the reality of the game can be enhanced.

According to the invention, a method for backing up a state of progress in a television game, comprises the steps of:
   dividing the state of progress into a common item and a separate item; and
   storing the common item into a common file and the separate item into a separate file.

According to another aspect of the invention, a method for backing up a state of progress in a television game, comprises the steps of:
   dividing the state of progress into a common item and a separate item; and
   storing the common item into a common file and the separate item into a separate file;
   wherein the television game is Continuously progressed in the process of real time proceeded by a clock means with which a main body or an external storage device of a home television game machine is provided.

BRIEF DESCRIPTION OF THE DRAWINGS

The invention will be explained in more detail in conjunction with the appended drawings, wherein.

DESCRIPTION OF THE PREFERRED EMBODIMENTS

A method for backing up a state of progress in a television game in the preferred embodiment according to the invention will be explained below, First of all, to carry out the invention in which a means for saving backing-up files is needed, it is necessary a rewritable back-up memory to be provided in a main body of a television game machine or in an external storage device.

Figure 1:
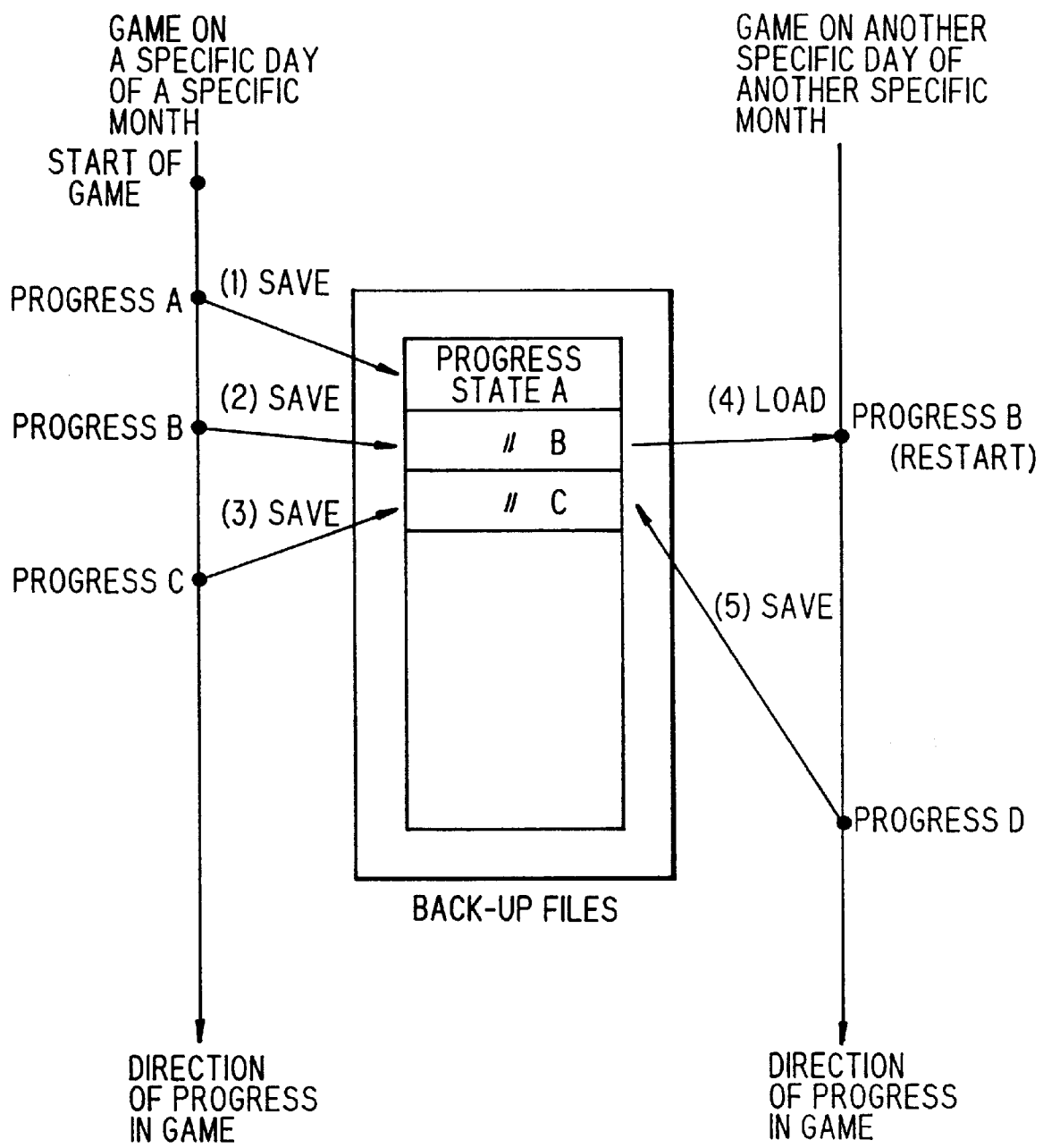
FIG. 1 shows relationships between back-up files and states of progress and between saving and loading in a conventional method for backing up a state of progress in a television game.
Figure 2:
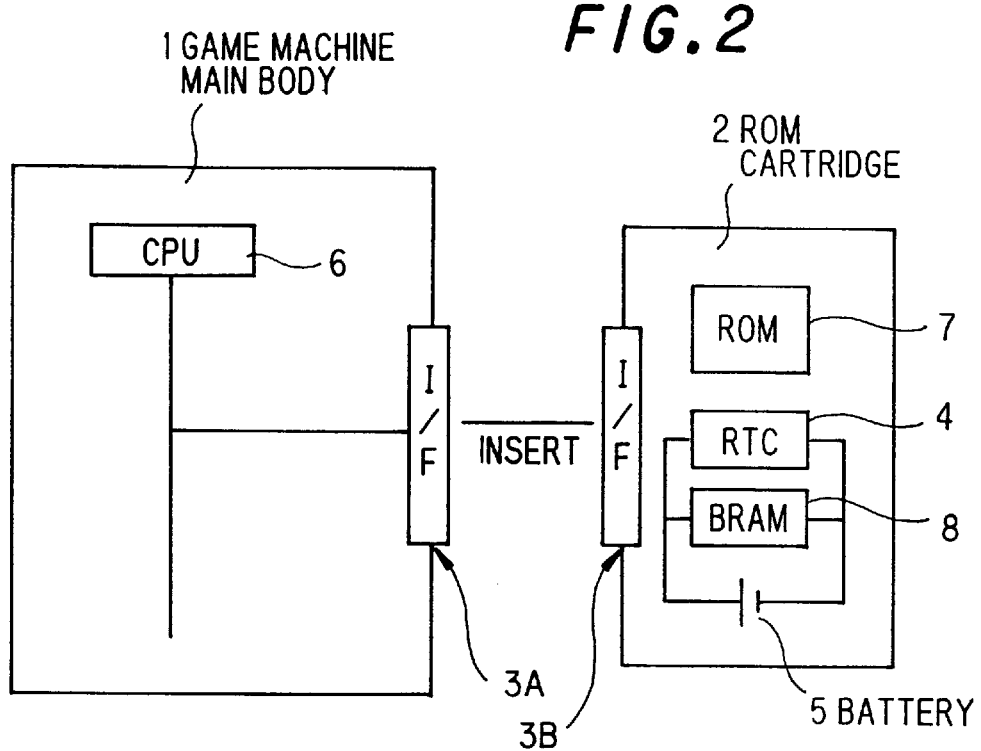
FIG. 2 is a block diagram showing a system which comprises a home television game machine main body and a RTC (real time clock) built-in ROM cartridge that is used in a preferred embodiment according to the invention.

FIG. 2 is a block diagram showing a system which comprises a home television game machine main body 1 and a RTC (real time clock) built-in ROM cartridge 2 that is used in the embodiment. The game machine main body 1 and the ROM cartridge 2 are connected through interfaces 3A, 3B.

RTC 4 built in the ROM cartridge 2 automatically ticks away year, month, day, hour, minute, second and day of the week. RTC 4 is backed up by a battery 5 and ticks away independent of the game machine main body 1. CPU 6 of the game machine can read and utilize the time of RTC 4 or can renew the time of RTC 4. A game software is stored in ROM 7 to be transferred to RAM 10. The game machine main body 1 has ROM 7 for storing an operation program.

In the case that RTC is not built in the ROM cartridge 2, a timer means included in the main body 1 of the game machine may be used to achieve the invention.

BRAM 8 is a memory backed up by the battery 5. Therefore, even if the power of the main body 1 is shut off, contents stored in BRAM 8 will be backed up. In this embodiment, a back-up file is stored in BRAM 8. The RTC 4 of the ROM cartridge 2 is used as a clock. Meanwhile, if the game machine is provided with BRAM and a timer means, ROM cartridges other than the above-mentioned ROM cartridge 2 can be applied to the invention.

Figure 3:
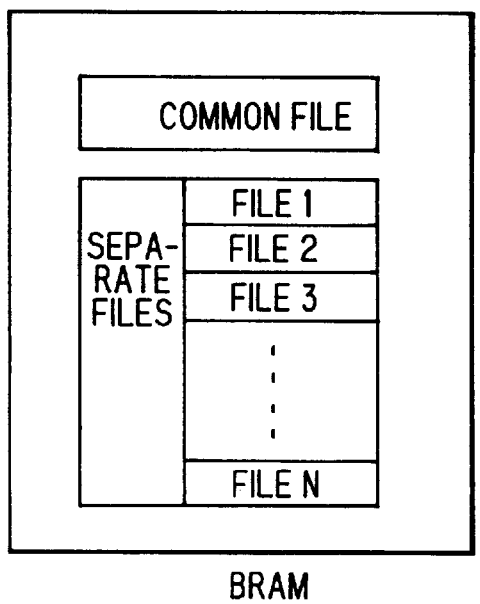
FIG. 3 shows a composition of back-up files for saving progress sates in a game in the embodiment.

In this embodiment, back-up files for saving progress sates in a game store a common item (data) and separate items (data), as shown in FIG. 3. In FIG. 3, a file to save the common item is called 'common file' and files to save the separate items are called 'separate file 1, separate file 2, separate file 3 . . . ', respectively.

The player can save the progress state of the game at an optional time. When a progress state is saved, it is divided into a common item and a separate item, and the common item is saved into the common file and the separate item is saved into a separate file n, where n is a file number. The maximum number of files to store the progress state is N, and an already written tile can be repeatedly rewritten. Of course, it is possible to rewrite on a file even if the number of files to be saved does not reach N.

If the player wants to restart the game from a state which is already saved, he can select the corresponding file number in the same manner as in the conventional method, when a tile number, for example, n, is selected, the separate file n and the common file are simultaneously loaded (read out) and the game starts from the progress state n. Though this process is similar to the conventional method, the content of the common file does not always correspond to the content saved at the time of the progress state n. Namely, the content of the common file is renewed whenever the progress state is saved. Therefore, the progress state at the time when the game is restarted may be different from that at the time when the separate file to be selected is saved.

Taking the case of a derivative scenario that a pet is fed, the embodiment will be further detailed. The content of the derivative scenario is as follows: 1) the pet has a strength, 2) the strength of the pet is decreased by one point an hour with real time (=actual time ticked away by RTC 4, 3) when the strength becomes zero, the pet dies, 4) the pet can be fed only in a pet shop.

In the above derivative scenario, the strength data of the pet is saved as the common item, of the back-up file, and the other state data by which the progress state can be reproduced, for example, a scenery, a state data of a hero (a character operated by the player), is saved as the separate item of the back-up file.

Figure 4:
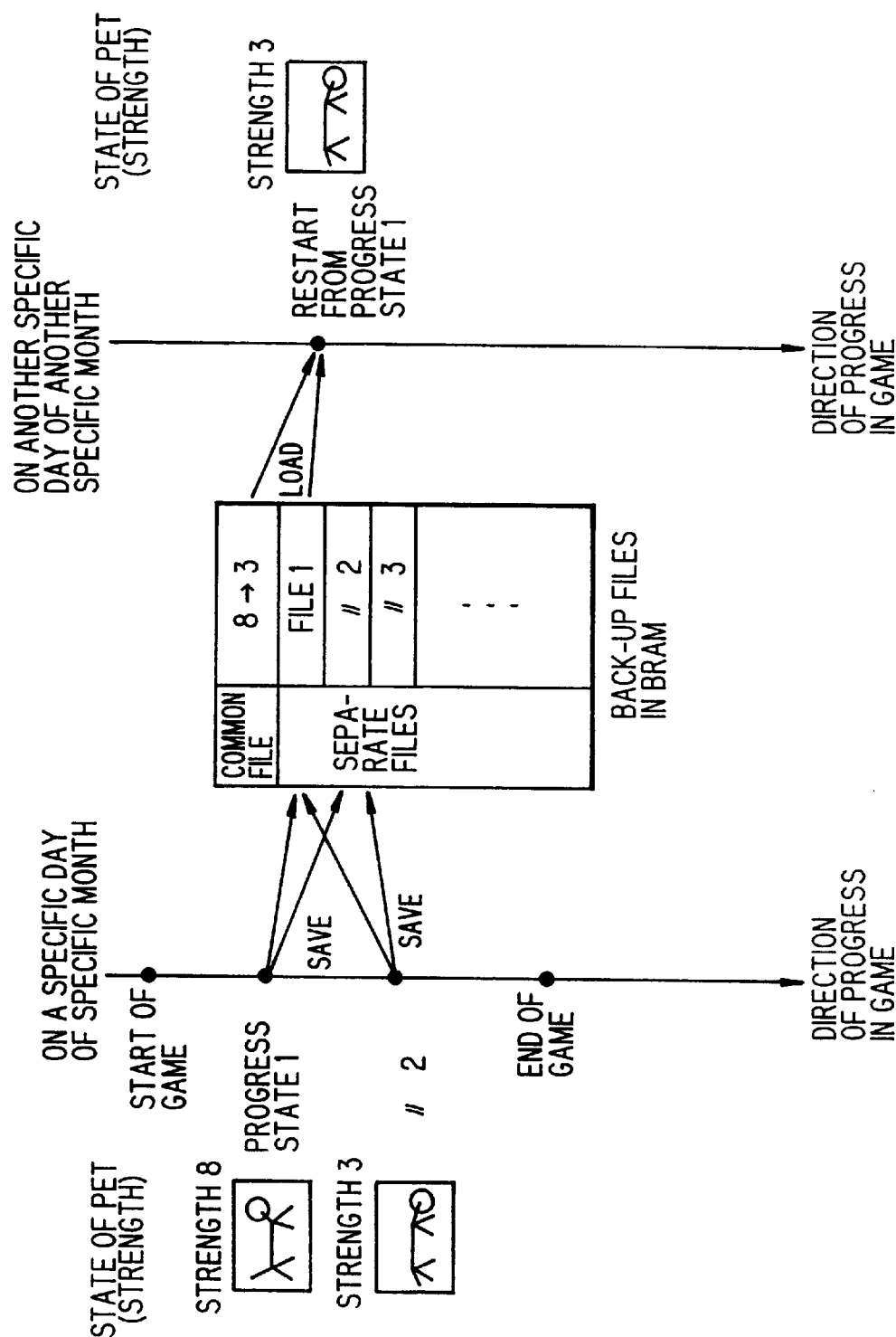
FIG. 4 shows a relationship between saving and loading of progress states of a game in the embodiment.

FIG. 4 shows saving and loading of progress states of the game. The game is played on a specific day of a specific month. Here, the progress of game is saved at the time of state 1 and then saved at the time of state 2. At state 1, the strength of the pet is eight, where it is observed that the pet walks vigorously. Then, at state 2, the strength is reduced to three, where the pet is depressed with its head dropped. In this case, the progress state 1 is saved into file 1 and the progress state 2 is saved into file 2. At state 1, the strength of eight is recorded in the common file. After that, by the saving at state 2, the content of the common file is rewritten such that the strength of the pet is three. Thereafter, the saving is not conducted.

Next, oh another specific day of another specific month, the game is restarted from the progress state 1.

The player expected the strength of the pet to be that recorded at state 1 of the previous day, but he notices that the strength is reduced to three. Thus, the player has to play the game to feed the pet not to die.

As a result, developments of the game on this day becomes quite different from those of the former day. Since information other than the pet is stored in the separate file, the states of hero, scenery etc. does not change. However, if only the state of the pet is changed, the developments become quite different.

Although the invention has been described with respect to specific embodiment for complete and clear disclosure, the appended claims are not to be thus limited but are to be construed as embodying all modification and alternative constructions that may be occurred to one skilled in the art which fairly tall within the basic teaching here is set forth.

What is claimed is:

1. A method of executing a television game, said game having one character operated by a player and another character, comprising:

backing up a first state of progress of the game at a first time, said first state of progress including a first state of said one character and a first state of said another character;

backing up a second state of progress of the game at a second time after the first time, said second state of progress including a second state of said one character and a second state of said another character; and restarting progress of the game from the first time so that said one character has the first state backed up at the first time and said another character has the second state backed up at the second time.

2. The method of claim 1, wherein the state of said another character varies in accordance with real time.

3. The method of claim 1, wherein:

backing up the first state of progress includes writing the first state of said another character in a common file and writing the first state of said one character in one of a plurality of separate files;

backing up the second state of progress includes writing the second state of said another character in the common file and writing the second state of said one character in another one of the plurality of separate files; and restarting progress of the game includes reading the first state of said one character from said one of the plurality of separate files and reading the second stated of said another character from said common file.

4. The method of claim 3, wherein the state of said another character varies in accordance with real time.

5. A game cartridge for insertion into a main body of a television game machine for executing a television game, said game having one character operated by a player and another character, comprising:

a ROM for storing an operation program;

a non-volatile memory for backed up states of progress of the game;

wherein said operation program configured, when executed by the television game machine, to cause the television game machine to perform the steps of:

backing up a first state of progress of the game at a first time, said first state of progress including a first state of said one character and a first state of said another character;

backing up a second state of progress of the game at a second time after the first time, said second state of progress including a second state of said one character and a second state of said another character; and restarting progress of the game from the first time so that said one character has the first state backed up at the first time and said another character has the second state backed up at the second time.

6. The game cartridge of claim 5, further comprising a real time clock;

wherein the operation program is further configured to vary the state of said another character in accordance with real time measured by the real time clock.

7. The game cartridge of claim 5, wherein the operation program is further configured to vary the state of said another character in accordance with real time measured by a real time clock disposed within the main body of the television game machine.

8. The game cartridge of claim 5, wherein the operation program is further configured to perform the steps of:

backing up the first state of progress includes writing the first state of said another character in a common file and writing the first state of said one character in one of a plurality of separate files;

backing up the second state of progress includes writing the second state of said another character in the common file and writing the second state of said one character in another one of the plurality of separate files; and restarting progress of the game includes reading the first state of said one character from said one of the plurality of separate files and reading the second stated of said another character from said common file.

9. The game cartridge of claim 8, further comprising a real time clock;

wherein the operation program is further configured to vary the state of said another character in accordance with real time measured by the real time clock.

10. The game cartridge of claim 8, wherein the operation program is further configured to vary the state of said another character in accordance with real time measured by a real time clock disposed within the main body of the television game machine.

\* \* \* \* \*